US011159320B2

United States Patent
Gözütok et al.

(10) Patent No.: US 11,159,320 B2
(45) Date of Patent: Oct. 26, 2021

(54) METHOD FOR SECURE CONNECTION

(71) Applicant: HAVELSAN HAVA ELEKTRONIK SANAYI VE TICARET ANONIM SIRKETI, Çankaya (TR)

(72) Inventors: Mesut Gözütok, Çankaya (TR); Oguzhan Sereflisan, Çankaya (TR); Kemal Biçakci, Çankaya (TR)

(73) Assignee: HAVELSAN HAVA ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 67 days.

(21) Appl. No.: 16/458,262

(22) Filed: Jul. 1, 2019

(65) Prior Publication Data
US 2021/0006405 A1 Jan. 7, 2021

(51) Int. Cl.
H04L 29/06 (2006.01)
H04L 9/32 (2006.01)
H04L 9/08 (2006.01)

(52) U.S. Cl.
CPC .............. *H04L 9/321* (2013.01); *H04L 9/083* (2013.01)

(58) Field of Classification Search
CPC ......... H04L 9/321; H04L 9/083; G06F 21/50; G06F 21/60; G06F 21/62; G06F 21/6209; G06F 21/78; G06F 21/79; G06F 21/80; H04W 12/106
See application file for complete search history.

(56) References Cited

U.S. PATENT DOCUMENTS

| | | | | |
|---|---|---|---|---|
| 9,319,897 | B2* | 4/2016 | Gupta | H04W 12/1208 |
| 9,686,240 | B1* | 6/2017 | Ray | H04L 45/741 |
| 2005/0054334 | A1* | 3/2005 | Brown | H04W 12/033 |
| | | | | 455/414.4 |
| 2014/0282543 | A1* | 9/2014 | Ignatchenko | G06F 9/45558 |
| | | | | 718/1 |
| 2015/0082024 | A1* | 3/2015 | Smith | H04L 67/1095 |
| | | | | 713/155 |
| 2015/0281186 | A1* | 10/2015 | Smith | G06F 21/10 |
| | | | | 726/27 |
| 2016/0191469 | A1* | 6/2016 | Zatko | G06F 21/6218 |
| | | | | 713/150 |
| 2018/0196761 | A1* | 7/2018 | Rieken | H04L 9/0861 |

* cited by examiner

*Primary Examiner* — Malcolm Cribbs
(74) *Attorney, Agent, or Firm* — Bayramoglu Law Offices LLC

(57) ABSTRACT

The invention relates a method involving calling of hardware components (i.e. memory, keyboard, microphone, user interface, etc.) being controlled by software units from trusted execution environment [102]; and encryption of the input from these elements within the trusted execution environment [102]; and transmission of the said encrypted data preferably normalized methods to the application in the rich environment [103]; transmission of the said encrypted data to the receiver via the application in the rich environment [103] via the methods of the application of the rich environment [103]; transmission of the said encrypted data using protocols/methods of the application running in the rich environment [103]; and at the receiving device being opened at the trusted execution environment [102] and being displayed to the user as such.

4 Claims, 2 Drawing Sheets

METHOD FOR SECURE CONNECTION

TECHNICAL FIELD

The invention relates to a method for secure connection in between two devices via applications; Specifically, the invention relates a method for secureconnection by data transmission in between at least two devices via an application being encrypted within a secure operating environment [102].

BACKGROUND ART

At the state of the art, users are made available to use multiple applications on a single device. These applications use multiple input elements [108] (such as camera, microphone, keyboard, various sensors, etc.) and output elements [109] (such as display, etc.) on devices (such as desktop computers, portable computers, mobile devices, smartphones, smart devices, etc.). These multiple applications can either be downloaded via an application market, or can directly be installed on the device. More to that, device producers tend to generate and publish multi layered operating environments such as Linux, Android and IOS and similar commercial products. These multi layered operating environments tend to include multiple capabilities and make installing new applications available.

The applications in mentioned devices include many sensitive, private and/or valuable information. For these information to be stored, kept and transmitted as required seems to be a need; banking applications, connectivity applications, content services and similar applications can be given as example. Being aware of the existence of these valuable and confidential information on devices, producers allow operating environments to include some methods for security.

One of these methods for security is the trusted execution environment [102] technology, designed to operate on especially mobile devices. Accordingly, the hardware and software included in the device generates a trusted execution environment [102] to execute all or a portion of applications. A trusted execution environment [102] is a field generated on the sources of the device for isolated execution of applications on the device. Trusted execution environment [102] enables the pre-defined sources to work on an isolated space restricting access from outside on the device only for applications designed to work on. Applications or elements that are not configured to work on the trusted execution environment continue their normal operation outside the safe zone called the rich environment [103]. The rich environment [103] defines the outside the safe zone created by the trusted execution environment. The user does not feel any change on operations of the applications working on the rich environment [103]. This is referred when an application is said to be working in the trusted execution environment [102] in the safe zone and out of the trusted execution environment as the rich environment [103].

A trusted execution environment [102] operates via generating trusted elements, These trusted elements may be processor, memory elements, embedded elements or others attached to the device. This trusted execution environment may be generated via techniques of virtualization or architectures generated via protocols or standards such as TEE™, working on the Trustzone™. The drivers present on the device for calling hardware can either be located in the trusted execution environment [102], or can be installed later. In the case that image providing interfaces being located in the trusted execution environment either as a whole or in part, this is referred as a user interface. In this case, the user interface (i.e. display) cannot be reached by another application installed on the device. The main idea here is sources being used by the device either as a whole or in part are closed to access as in the time period they operate within the trusted execution environment [102]. Hereby, the architectures, standards and products may vary. The main point is trusted execution environment [102] to be restricted to all outsider applications, but only used by applications working herein.

In the state of art, although there are multiple solutions in the field of communication via trusted execution environment [102] no such solution could be gathered from available documents.

SUMMARY OF INVENTION

The invention relates a method involving calling of hardware components (i.e. memory, keyboard, microphone, user interface, etc.) being controlled by software units from trusted execution environment [102]; and encryption of the input from these elements within the trusted execution environment [102]; and transmission of the said encrypted data preferably normalized methods to the application in the rich environment [103]; transmission of the said encrypted data to the receiver via the application in the rich environment [103] via the methods of the application of the rich environment [103]; transmission of the said encrypted data using protocols/methods of the application running in the rich environment [103]; and at the receiving device being opened at the trusted execution environment [102] and being displayed to the user as such.

The present invention relates a method for security working on variations on connectivity applications [101]. Accordingly, via an added selection menu to the connectivity application [101], a sender [104] passing through authentication [106] calls the connectivity application [101] as a whole or in part (i.e. writing window) and at least one of the hardware affecting these (microphone, keyboard, display, etc.) from the trusted execution environment [102]. After this selection has been made and the specific fields have been called from the trusted execution environment [102], the access to these fields outside the trusted execution environment has been restricted from outsider sources. Upon this action to call, the user makes the input in the trusted execution environment [102]. The input [108] provided by the user in the trusted execution environment [102] are taken into safe memory elements within and are subject to encryption within encryption [107] within the trusted execution environment [102]. Prior to encryption [107] within the trusted execution environment [102], the original unencrypted record of the input within is deleted and the encrypted record of the input is transferred to the rich environment or preferably to the connectivity application [101]. Prior to this step, the encrypted message is transferred to the receiver via regular means of the connectivity application [101]. The present invention does not affect the method of transmission of the connectivity application [101], but uses its method of transmission as is.

The message being gathered, encrypted and transferred to the rich environment [103] is transferred to the receiver [105] via methods of the connectivity application [101]. Prior to transfer, the receiver [105] recognizes the message as encrypted within the connectivity application [101]. At this step, preferably, an audio and/or a visual element (i.e. a visual element in the form of a lock, a visual element in the form of text, an audio element in the form of a specific tone, a combination of these, etc.) is used for separation from other messages and in the event of activation of this element, a medium for authentication [106] is opened. in the said authentication [106], the process of authentication [106] can be handled via various methods that are well-known, entering a password in a window, reading of finger print of the user or methods based on behavioral analytics are some examples of this.

Prior to an authentication [106] held preferably in the trusted execution environment, the message sent by the sender [104] via the connectivity application [101] is copied as encrypted to a memory element taken into trusted execution environment [102] and decrypted within the trusted execution environment with the known key being presented on an output element [109] taken into the user interface covering whole or a portion of the output element displayed, shown or played to the user.

In the event of the method of invention is not present in the receiver [105] (i.e. not installed in the device), the receiver [105] recognizes the message as encrypted and meaningless set of characters. in the event of the method of invention is installed on the receiver's [105] device and can not be operated due to various reasons, either permanent or temporary, the message can be viewed by the user as encrypted and as a set of meaningless characters combined. If the message carried is not a text message but an audio or video message, the. encrypted message in this case will be a message of preferably the same kind and will be a message that does not include a meaning, but will be perceived as meaningless content.

The present invention relates a method for encryption [107] of messages within the trusted execution environment [102] in addition to encryption and transmission protocols of the connectivity application [101] being used. The memory and processor portions that handle these processes and input elements [108] and output elements [109] are called and processed from the trusted execution environment [102]; and bi-directional images are presented within the user interface covering whole or a portion of the screen.

The present invention hereby presents a method for prevention of access to messages from external sources to the device being used.

As the calling from trusted execution environment [102] is obvious to a person skilled in the art, details of the said operation has not been given throughout the description. Moreover, as encryption [107] and decryption are obvious to a person skilled in the art and there exits multiple methods to handle these operations, details of such has not been denoted throughout the description.

BRIEF DESCRIPTION OF DRAWINGS

The explanations of drawings associated with the description is as follows.

DESCRIPTION OF EMBODIMENTS

Figure 1:
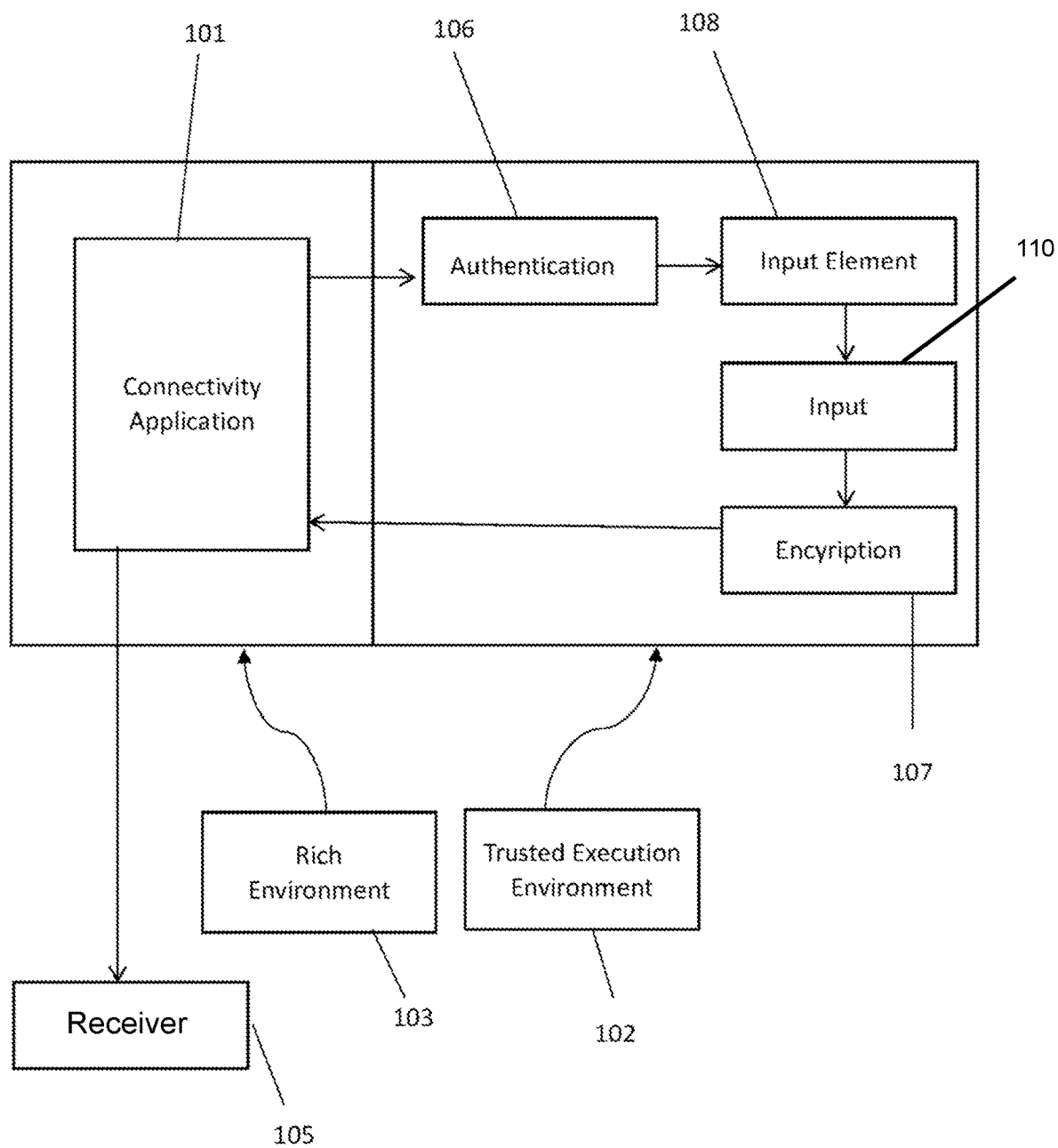
FIG. 1 represents the application basics of the method of invention as in the device of the sender [104] schematically. Accordingly, a part of the connectivity application [101] continues to work on the rich environment [103], only the input [108] elements to be used to provide an input by the user are migrated to trusted execution environment [102]. Except for said elements, the connectivity application [101] continues normal function as is. Meanwhile, the message received via elements called within the trusted execution environment [102], is encrypted [107] within the trusted execution environment [102] and moved to rich environment [103] as encrypted. The encrypted and moved message is transferred to the receiver [105] by the means of connectivity application [101] which may include encryption as secondary.
Figure 2:
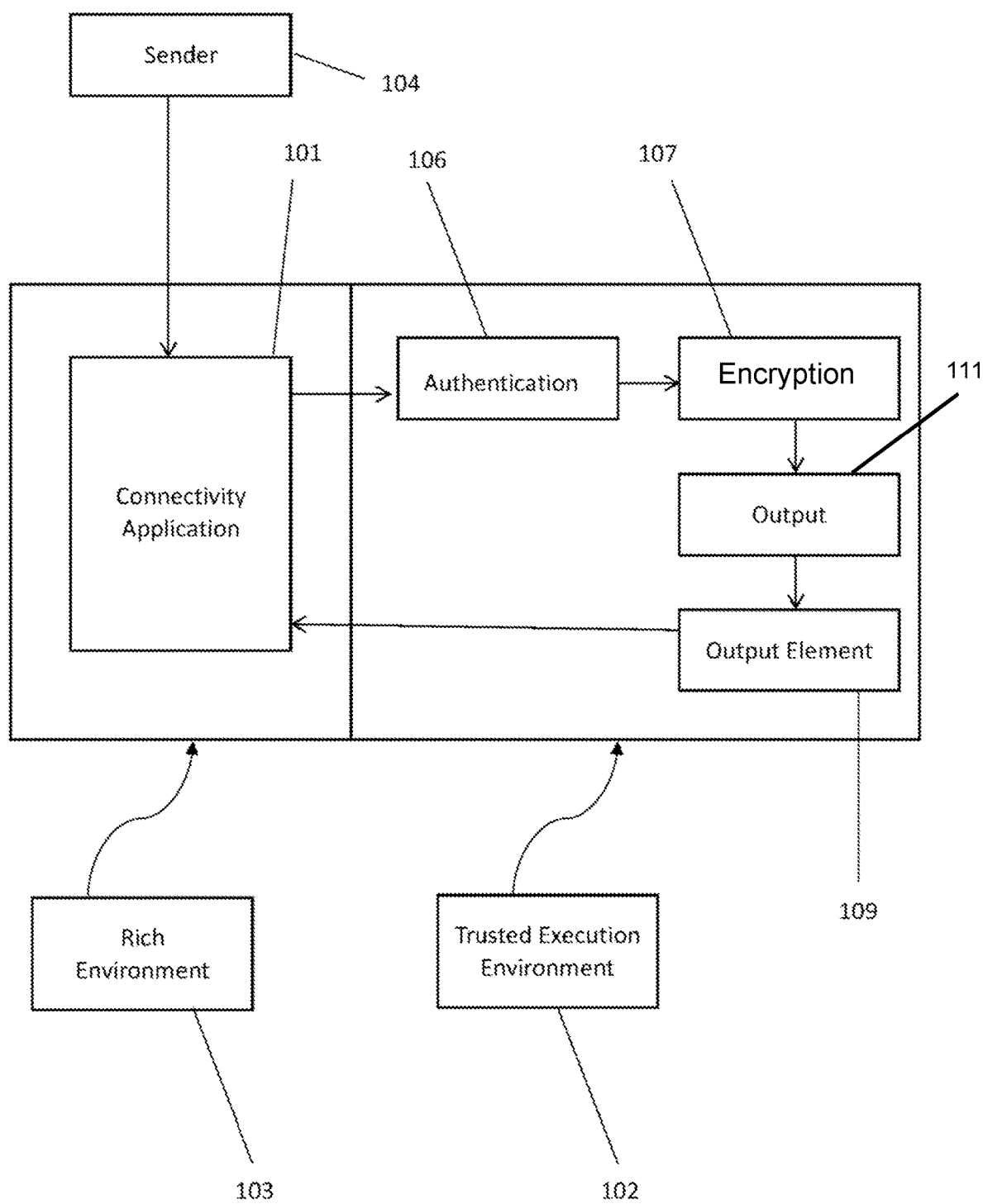
FIG. 2 represents the application basics of the method of invention as in the device of the receiver [105] schematically. Accordingly, the message being received as encrypted is shown within the connectivity application [101] and a preferably visual selection menu is made available to the user for migration to trusted execution environment [102]. If this selection made available is activated, a process of authentication [106] is applied and the encrypted message is decrypted within the trusted execution environment [102]. The decrypted message is made available to the user on the user interface covering whole or a part of the screen.

The embodiments preferred for a better understanding of the invention are as follows;

101—Connectivity application: An application used to transfer written, audio, visual messages or files from sender [104] to receiver [105]. Working on the operating system of the device, it has unique protocols on transmission, approval and similar issues. The. method of current invention is a method for secure. connection does not interact with these protocols.

102—Trusted execution environment: An operating environment generated on the device, being confined to access from outside; including drivers for device components or enabling drivers to be installed onto; via calling of these drivers within, restricting all access from outside so that operations cannot be monitored or intervened.

103—Rich environment: The whole operating environment of the device except for the trusted execution environment [102]. The whole operating environment of the device in the case trusted execution environment [102] is not installed.

104—Sender: The real person generating the message and using the connectivity application [101] to transfer the message to the receiver [105]. Sender is the input producer within the concept of the invention disclosed.

105—Receiver: The target of the message generated within the connectivity application [101] by the sender [104].

106—Authentication: The security protocol for access to the trusted execution environment [102]. Access to the trusted execution environment [102] is restricted by known means at the state of art. These methods of restriction may be various.

107—Encryption: Encapsulation of a message with the information sufficient to discapsulation of the said can be made available in the methods available in the state of the art. Makes the encrypted message impossible to read and decrypted via a specific key.

108—Input element: The hardware and respective driver(s) that provide the message to the connectivity application [101]. For text messages a keyboard or screen keyboard including a touch surface and screen; for voice typing a microphone and respective software; for visual messages a camera or known means to transfer a visual entry to device can be stated for better understanding.

109—Output Element: Hardware element and their respective drivers used by the connectivity application [101] for a message to made available by the user. Screen, speakers, earphones and similar hardware known in the state of art maybe. given as examples for better understanding.

110—Input, 111, Output.

The user interface: The user interface generated by calling of whole or a part of the output element [109] and its drivers from the trusted execution environment [102] so that is closed to all attempts far access from outside can be applied in all output elements [109], i.e. screen.

Patent Literature

PTL1:

Non Patent Literature

JNPL 1:

What is claimed is:

1. A method for a secure connection via a connectivity application [101] within a trusted execution environment [102], comprising
   a. receiving of an input from a sender [104] via the connectivity application operating on a rich environment [103] where input elements [108] are called from within the trusted execution environment [102];
   b. the input received within the trusted execution environment [102] being subject to an encryption [107] within the trusted execution environment [102], and prior to the encryption original unencrypted record of the input within the trusted execution environment is deleted;
   c. a message transferred to outside of the trusted execution environment [102] as encrypted and transfer of the message to the connectivity application [101] as encrypted and being transferred to a receiver by the connectivity application [101] by regular methods;
   d. the message transferred to the receiver [105] being available in encrypted form; the available message being displayed in a way making available a user to distinguish; the message being transferred to the trusted execution environment [102] and being decrypted within;
   e. a decrypted message being displayed to the user via a user interface being called within the trusted execution environment [102],
   wherein an audio element in a form of a specific tone and/or a visual element in a form of a lock, or a text, is used for separation from other messages and in an event of activation of the audio element and/or visual element.

2. The method according to claim 1, comprising a transition in between the rich environment [103] and the trusted execution environment [102] done via a process of an authentication [106] in both ways and the authentication being made within the trusted execution environment [102].

3. The method according to claim 2, comprising a trusted user interface [110] covering whole or a portion of a screen if the message contains a text or visual elements.

4. A non-transitory medium being loaded and operating a software for mobile or fixed computing apparatus comprising
   a. receiving of an input from a sender [104] via a connectivity application [101] operating on a rich environment [103] where input elements being called from within a trusted execution environment [102];
   b. the input received within the trusted execution environment [102] being subject to an encryption [107] within the trusted execution environment [102], and prior to the encryption original unencrypted record of the input within the trusted execution environment is deleted;
   c. a message transferred to outside of the trusted execution environment as encrypted and transfer of the message to the connectivity application [102] as encrypted and being transferred to a receiver by the connectivity application by regular methods;
   d. the message transferred to the receiver [105] being available in encrypted form; the available message being displayed in a way making available a user to distinguish; the message being transferred to the trusted execution environment [102] and being decrypted within;
   e. a decrypted encryption [107] the message being displayed to the user via a user interface being called within the trusted execution environment [102],
   wherein an audio element in a form of a specific tone and/or a visual element in a form of a lock, or a text, is used for separation from other messages and in an event of activation of the audio element and/or visual element.

* * * * *